W. A. MARCY.
TRAY CONVEYING APPARATUS.
APPLICATION FILED SEPT. 23, 1915.
1,300,987.
Patented Apr. 15, 1919.
2 SHEETS—SHEET 1.
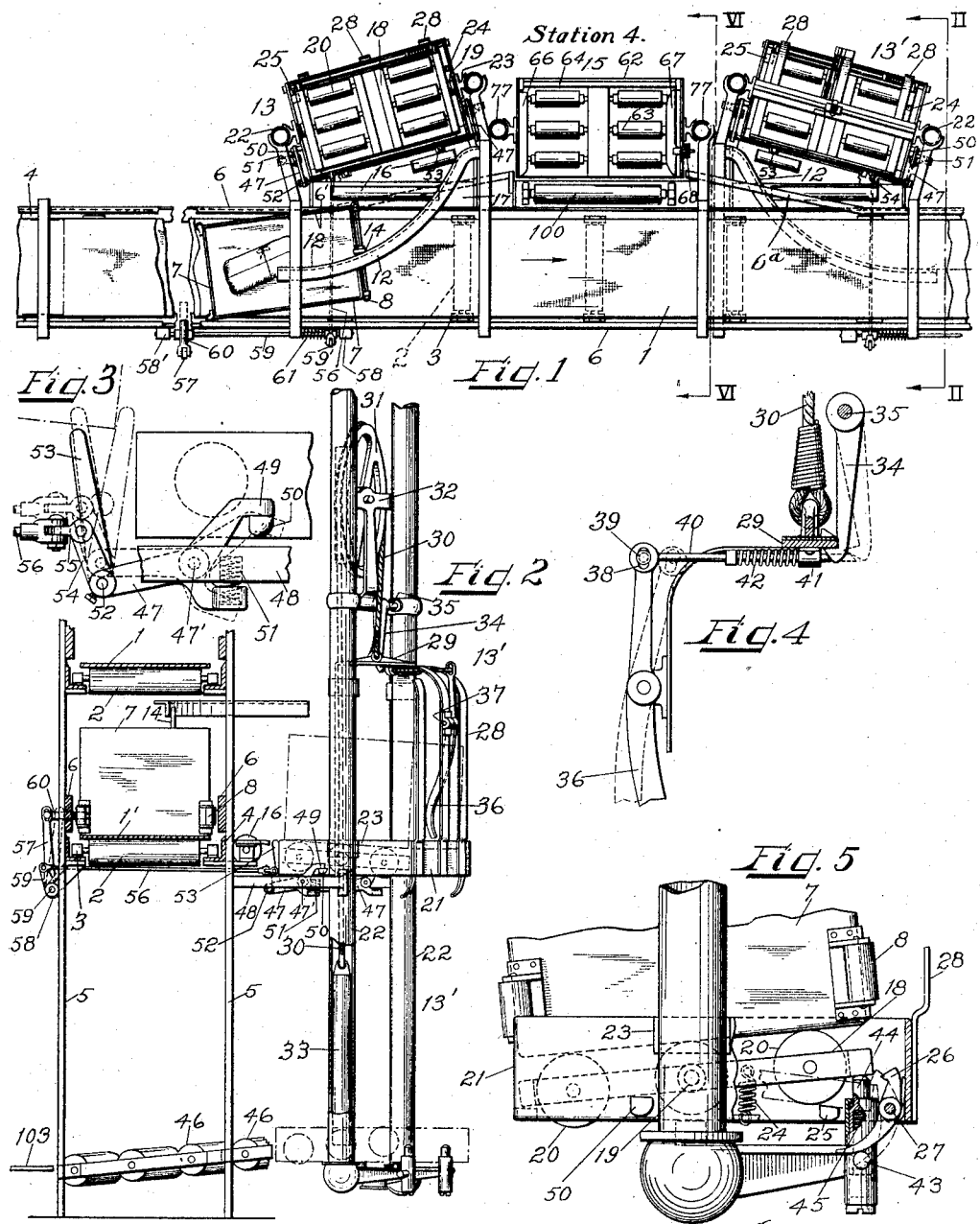
Witnesses.
Charles O. Laurine
D. L. Bennett
Inventor.
Willard Adna Marcy
By [signature]
Attorney

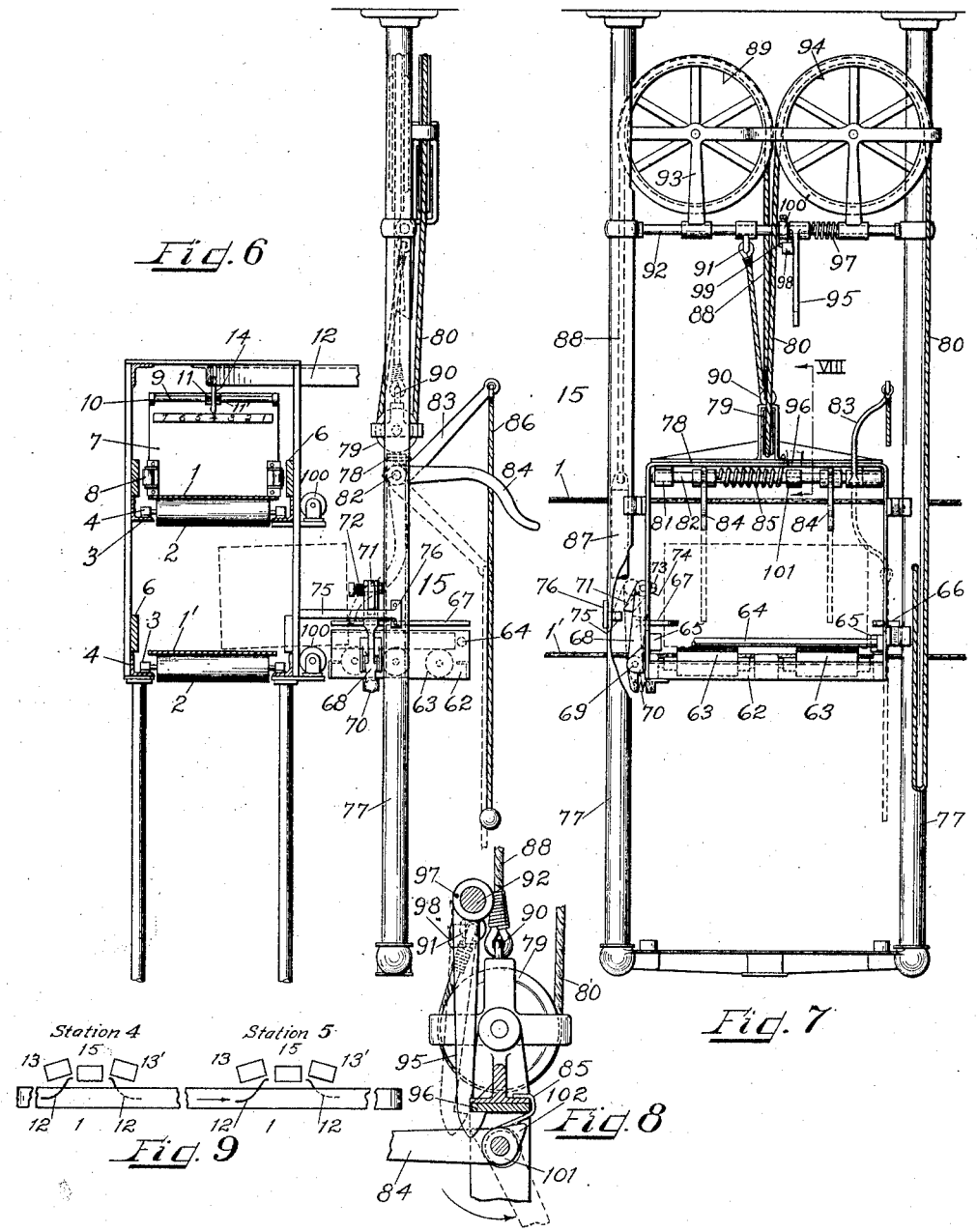

UNITED STATES PATENT OFFICE.

WILLARD ADNA MARCY, OF NEWTON UPPER FALLS, MASSACHUSETTS, ASSIGNOR TO THE LAMSON COMPANY, OF BOSTON, MASSACHUSETTS, A CORPORATION OF NEW JERSEY.

TRAY-CONVEYING APPARATUS.

1,300,987. Specification of Letters Patent. Patented Apr. 15, 1919.

Application filed September 23, 1915. Serial No. 52,198.

*To all whom it may concern:*

Be it known that I, WILLARD ADNA MARCY, a citizen of the United States, residing at Newton Upper Falls, in the county of Middlesex and State of Massachusetts, have invented certain new and useful Improvements in Tray-Conveying Apparatus, of which the following is a specification.

This invention relates to loading and unloading apparatus for belt conveyers and the like and more particularly concerns an improvement in what are known as tray conveyers.

One of the objects of the present invention is to provide a mechanism whereby an article, such as a tray, can be caused to move substantially vertically from one level to another, so that said article is brought into substantially the plane of a belt conveyer or the like, after which the article is unloaded onto said conveyer for transportation to a given point.

A further object has been to provide mechanism for selectively removing a tray or the like from a belt conveyer or similar apparatus, and thereafter translating the tray or other article so removed, from the plane of the belt conveyer to a different level.

A further object of my invention has been to provide novel elevators and lowerators particularly adapted for use in connection with belt conveyers, and more especially to conveyers of the type in which the upper side or run of a belt is used to carry articles in one direction, while the lower side or run similarly carries articles in an opposite direction.

These and other objects of my invention will be hereinafter referred to and the novel combination of means and elements whereby said objects may be attained will be more particularly pointed out in the claims appended hereto.

In the accompanying drawings, which form parts hereof, and in which like reference characters designate like parts throughout the several views, I have exemplified a preferred construction; but as I am aware of various changes and modifications which may be made herein without departing from the spirit of my invention, I desire to be limited only by the scope of said claims.

Referring to the drawings:

Figure 1 is a plan view of a fragment of a belt conveyer, showing a despatching and receiving station at which are located lowerators, respectively serving the upper and lower runs of the conveyer, and an elevating device adapted to deliver articles to either of said runs.

Fig. 2 is a vertical section taken on lines II—II of Fig. 1 and showing one of the lowerators in position to receive a tray from the lower run of the conveyer; the section being drawn to an enlarged scale.

Fig. 3 is a detail of a stop mechanism provided in connection with the lowerator.

Fig. 4 is a detail view of a latching device which constitutes a part of the lowerator mechanism.

Fig. 5 is an enlarged detail view of the tilting table of the lowerator; and certain operating parts therefor.

Fig. 6 is a vertical section taken on lines VI—VI of Fig. 1, drawn to an enlarged scale and showing the construction of the elevator.

Fig. 7 is a front elevation of the elevator shown in Fig. 6.

Fig. 8 is a detail view of a latch and the actuating means therefor, used in the elevator, and Fig. 9 is a diagrammatic representation of sections of the conveyer with adjacent stations.

For convenience of description the upper run or side of the conveying belt has been designated 1, while the lower run has been correspondingly designated 1'. This belt may be of the usual endless type and is supported at intervals along its length, under both the upper and lower runs, by rollers 2, journaled in suitable brackets 3, preferably carried by angle-irons 4, connected to and supported by suitable uprights 5, disposed at intervals along the length of the conveyer.

Running boards 6 may be located above the angle irons, in a known manner, for the purpose of retaining the trays 7 or other articles being conveyed by the belt, in place upon the latter; and I prefer to provide rollers 8 at the respective corners of each of the trays, which rollers are positioned for engagement with the running boards.

The trays may also be provided with means whereby they may be selectively removed at the station; the preferred means of this character being best shown in Fig. 6, where a bar or shaft 9 is shown, adjacent the upper edge of the tray, as being mounted in suitable brackets 10 attached to the body of the tray; the shaft 9 carrying a sleeve or slide member 11, which carries a vertical pointer or finger, the upper end of which is adapted for engagement with one or another of the deflecting angles or members 12, one of which is located at each station for coöperation with a given side or run of the belt.

The sleeve 11 of each tray may be set in position along the length of the shaft 9 by means of screws 11' or the like, in order to determine the station at which the tray is to be unloaded.

Immediately below the shaft 9 is a preferably numbered scale, the numbers upon which correspond to the respective stations.

As viewed in Fig. 6 the tray 7 shown upon the upper run of belt, is approaching the eye; and is destined to be shunted off from the belt by the deflector or guide 12 which delivers to the lowerator broadly designated 13, shown in Fig. 1; but omitted to avoid confusion, in Fig. 6. The station for which this tray is destined is number 4; but it is evident that had the pointer or finger 14 been set for station 5, its upper end would have cleared the deflector 12 of said station 4, but would thereafter have been correspondingly engaged with and deflected by the guide 12 of the next station along the route, i. e. station 5.

In other words, the respective guides 12 for a given run of the belt obviously extend out successively farther and farther toward the left, as viewed in Fig. 6, as one moves in the direction of travel of the belt.

Opposite the lowerator and elevator of a given station, the adjacent side board 6 is cut away; the ends of the board being preferably beveled as at 6' to facilitate the emplacement of the trays upon the lowerators.

As shown in Fig. 1, also, the end of the side board which will first come into engagement with a tray delivered from the elevator (which elevator is broadly designated 15) is preferably bent or directed outwardly away from the belt at a slight angle as at 6ª, to insure the proper emplacement of a tray delivered by the elevator onto said belt.

Referring again to the left-hand side of Fig. 1, the tray therein shown as being wiped off from the belt by the guide 12, will pass over the rollers 16, which preferably project up through a plate 17, which forms as apron in front of the lowerator, until said tray has been delivered to the tilting table or cradle 18 of said lowerator.

This cradle preferably comprises a frame provided with trunnions 19 substantially on the medium line thereof, said frame having journaled therein rollers 20 upon which the tray may ride freely into or out of the lowerator, according to the tilt of the cradle.

The trunnions 19 of the pivoted frame or table 18 are journaled in a frame or casing 21 which is slidably mounted between uprights 22; fork-like shoes 23 being provided upon the sides of the frame 21 which partly encircle the tubular uprights 22.

The tilting table or cradle of the lowerator is normally held, when out of its lowermost position between the uprights 22, so that its left-hand side, as viewed in Fig. 5, is higher than its right-hand side. In said figure, the position which the cradle occupies when so disposed, is indicated, in part, by dash and dot lines, and the amount which the cradle needs to tilt in either direction, either to retain the tray 7 in place thereon, or allow it to roll off from the cradle, is but slight. A light spring 24 may be used to give the cradle a bias for its tray-holding position while a stop 25 upon the innerside of the frame 21, serves to limit the tilting movement.

Owing to the fact that the tray may be unevenly loaded and in any case to insure the proper emplacement of said tray upon the cradle, when being removed from the belt, it is preferable to provide a latch 26, which may be pivoted to the frame 21, as at 27, and which when moved into its dotted line position, shown in Fig. 5, by the action of gravity upon the tail-like lower end of said latch, engages with the upper edge of the cradle frame 18 and resists any tendency of the load emplaced upon the cradle to rock the latter counter-clockwise, as viewed in said figure.

The frame 21 preferably has attached to its outer side, as shown to the right in Fig. 2, one or more rigid supporting elements or bars 28 which curve around at their upper ends to adapt them for attachment to a yoke 29, which also rides between and is in slidable engagement with the tubular uprights 22. In order to better illustrate certain of the details of construction in Fig. 2, the bar 28 nearest the viewer, has been broken away at its upper end; but it will be understood of course that these bars are sufficiently stiff to maintain the plane of the frame 21 substantially horizontal at all times.

Attached to the center of the yoke 29 is one end of a rope or cord 30 which passes thence upward and around a pulley 31, journaled in a bracket 32 which is connected rigidly and securely to the upright 22; the said rope thence extending down into one of the tubular members and having attached to its lower end a counter-weight 33 which is just sufficiently heavy to cause the elevator platform or cradle to ascend to its uppermost position, when unloaded.

When said platform is thus disposed and until a tray has been properly delivered thereto, a latch 34 pivoted upon a cross-bar 35, which extends between the uprights 22 and which also preferably carries, in part at least, the bracket 32 above referred to, is in engagement with the yoke 29, as best shown in Fig. 4.

After a tray has rolled down onto the cradle, its forward side engages a lever 36, which may be pivotally connected as at 37 to one of the upright bars 28.

The upper end of said lever 36 is slotted as at 38 to receive the bent and headed end 39 of a bolt 40 which is slidably mounted in a bracket 41 attached to the underside of the yoke. A spring 42 normally holds this bolt and its lever 36 in their inoperative positions to permit the latch 34 to engage yoke 29 when the latter is elevated; but when a tray rides onto the cradle it presses back the lever 36 and causes bolt 40 to unlatch the frame 21, whereupon the weight of the tray overcomes the counterweight 33 and the cradle with its load descends.

Upon reaching substantially its lowermost position the tail like end of latch 26 engages a pin 43 and is thereby rotated clockwise, as viewed in Fig. 5, to free the cradle 18, while at the same time a pin 44 which had been driven down by the cradle when the latter was still latched, is impelled upwardly by its spring 45, to rotate the cradle into the position in which it is shown in full lines in Fig. 5, to permit the tray to roll off onto the rollers 46, as indicated, somewhat diagrammatically, in Fig. 1.

As soon as the tray leaves the cradle, the latter is again tilted by its spring 24, and relatched, while the counterweight 33 descends and lifts the frame 21 and its cradle to their upper positions when these parts are again latched up by latch 34.

There are also provisions for preventing a second and following tray from being delivered to the lowerator when the cradle of the latter is not in position to receive such second tray. To this end and as best shown in Figs. 2 and 3, there are provided two rocker arms 47, each pivoted as at 47' to fixed cross members 48, and each having a finger 49 adapted for engagement with a lug 50 on the side of frame 21, so that when the latter is all the way up, each arm 47 is rotated against the action of a spring 51, into the position in which one of said arms is shown in full lines in Fig. 3. The left hand end of each arm 47, as viewed in said figure, has journaled therein the corresponding end of a shaft 52, which carries two fingers or levers 53 and also a crank arm 54, all extending upwardly, as shown in Fig. 3, and the crank arm having connected thereto a clevis 55, which in turn is pivotally connected to the preferably forked end of a link or rod 56. On the outer side of the conveyer are brackets 58—58' in which is mounted a rock-shaft 59 which carries two arms 59' and 60. To the first of these, is connected the outer end of rod 56, which extends laterally across and under the conveyer, whereby to operate the rock-shaft from the fingers 53. The upper end of lever 57 is preferably slotted to receive the bent end of a bolt or stop 60, which is suitably guided for movement into and out of the path of trays traversing the conveyer way.

As soon as the emplacement of a tray upon the cradle of the lowerator effects the unlatching of the latter and permits said cradle with its load to descend; the stop 50 upon the cradle frame releases the finger 49 and the spring 51 thereupon rocks the arm 47 clockwise, as viewed in Fig. 3, and thereby raises the shaft 52 together with the fingers 53 and crank arm 54, up to their dotted line position. This movement, it will be observed, has caused no corresponding movement of the bolt or stop 60; since the rod 56 has merely pivoted about its connection to the lever 57, and hence, any succeeding tray which may be traveling along the way is free to continue so to travel and the service is uninterrupted. If now, however, such a succeeding tray has the finger 14 thereof set for engagement with the guide 12 corresponding to this particular lowerator, said tray after having been swept off or preferably but partly off from the belt, will be stopped by the fingers 53, owing to the raised position of these latter. Not only will this tray be stopped to prevent it from dropping down into the lowerator, which is already occupied; but further, the engagement of the fingers 53 by this tray, causes said fingers to rotate clockwise, as viewed in Fig. 2, which correspondingly rotates the shaft 52 and thereby the crank arm 54. This places the rod 56 under tension and causes it to rock the shaft 59 and swing the lever 57 in toward the conveyer, against the action of a spring 61 on the rock-shaft, driving the bolt 60 out into the path of any succeeding tray which might collide with the tray which has been brought to rest against the stop fingers 53; movement of the latter of course being limited by the throw of the arm 57.

As soon as the cradle of the lowerator has been returned by its counter-weight 33 to its upper or normal position, the stops 50 will by such time have rotated the arms 47 counter-clockwise, into the positions in which they are shown in full lines in Figs. 2 and 3. This draws down the fingers 53 and of course releases the tray which has been in engagement with said fingers, permitting the tray to move into place upon the cradle, aided by gravity and in part preferably, also, by the conveyer belt. The arm 57 and its bolt 60 will be returned to their inoperative positions by the spring 61 upon the shaft 59 as soon as the fingers 53 are disengaged from the tray about to be delivered to the cradle of the lowerator, so that the main run-way of the conveyer is then open and any trays which may have collected thereupon are free to continue on toward their respective points of delivery.

A construction similar to that just described is of course provided in connection with each lowerator so that no matter in which direction a tray may be traveling, it cannot jam the conveyer; but of course there may be a temporary stoppage of trays en route therealong when the stop 60 is operatively disposed.

For delivering trays to the way or conveyer, for travel in either direction thereupon, the elevator 15 at each station, is as shown in Fig. 6, adapted to be raised from the lower level up to one of two positions where it is preferably latched up. The elevator platform comprises a frame 62 within which are mounted rollers 63 to form a platform for the trays. A bar 64 across the rear side of the frame provides a stop for the trays, while fixed blocks 65 aid in centering the tray laterally. As shown in Fig. 7, above the right-hand block 65 there is also a guide 66, which may if desired be fixed, since if the elevator platform be latched up upon but one side, this will ordinarily be sufficient for light loads. Opposite the guide 66 is a movable guide or latch operating part 67 which is fixedly attached to and projects laterally from an arm or lever 68, pivoted at 69 in a bracket upon the side of the frame 62. A spring 70 normally holds the upper end of arm 68 and the guide 67 in their innermost positions; but when a tray is pushed in place upon the platform, a side thereof bears against the part 67 and thereby rocks or cams out the arm 68 into its dotted line position, shown in Fig. 7. The upper end of arm 68 carries a latch member 71, which is held out in its latching position by a spring 72; the latch having a stop 73 to limit the clockwise rotation of said latch, as viewed in Fig. 7. So long as the arm 68 occupies its full line position, as shown in said figure, the latch 71 will clear a bar 75 which projects from its attachment 76 toward the conveyer, being carried by one of the uprights 77 which guides the elevator platform in a manner similar to that in which the platform of the lowerater, previously described, is guided. When however, a tray is emplaced upon the platform of the elevator, the consequent outward movement of the arm 68 brings this latch 71 into position where it may engage the bar 75. If the elevator be at its lower level, then, as the platform is raised, the latch will snap past the bar 75 which will effectively prevent the lowering of the elevator platform below the lower of its unloading position, until the tray has been propelled or unloaded in the manner now to be described.

Extending upwardly, between the uprights 77, from the frame 62, is a yoke or bail 78, to the center of which is attached a bracket within which is mounted a pulley 79 around which passes the hoitsing rope 80. Below the tranvserse portion of the bail 78, and journaled in brackets 81, connected to the latter, is a shaft 82 which carries an operating arm 83 and two ejecting arms 84, by means of which the tray is propelled or ejected from the elevator platform onto one or the other runs of the belt. A spring 85 normally holds the arms 84 in the position in which they are shown in full line in Fig. 6. When the cord 86, attached to the operating arm 83, is pulled downwardly however, the shaft 82 is rotated clockwise, as viewed in Fig. 6, and the arms 84 are brought into engagement with the rear side of the tray, and the latter is kicked or pushed off from the elevator platform onto the belt. The weight of the elevator platform is in part counter-balanced by a weight 87 which rides within one of the uprights 77, a rope 88 being connected to this weight and extending up through the tubular upright and thence around a pulley 89 and down to the eye 90, immediately above the pulley 79. This weight however is not sufficient to raise even the unloaded elevator platform from its lowermost position but it does very nearly counter-balance the weight of said platform. The latter is raised by means of the rope 80 which passes around the pulley 79 and has one end thereof attached at 91 to the cross-bar 92 which carries the frame 93 within which are journaled the pulleys 89 and 94. The other side of the rope 80, extending up from the pulley 79, passes around this pulley and thence down to a point at which the operator can conveniently reach the same, as shown to the right of Fig. 7.

Assuming now that instead of desiring to despatch the tray upon the lower run of belt, it is intended that the tray should be delivered to the upper run designated 1. In such case the elevator platform with its load would be raised past the position at which the latch 71 would engage the bar 75, until a latch 95, pivoted upon the shaft 92, enters a latching recess 96 in the transverse portion of the bail 78. The latch 95 is normally held in its latching position by means of a spring 97, which rotates the latch until a stop 98 thereon comes into engagement with a corresponding stop 99 upon a collar 100', fixedly mounted upon the shaft 92.

Fig. 8 shows this latch 95 in engagement with the yoke, the elevator platform having been raised to its upper level and the several parts shown in said figures being viewed from the line VIII—VIII, indicated in Fig. 7. At this upper level, the unlatching or releasing of the elevator platform is preferably accomplished by the last portion of the movement of the shaft 82; since by such time the tray being unloaded by the arms 84, in the manner above described, will have been properly emplaced upon the upper receiving roller 100, and the belt section adjacent thereto. The unlatching of the elevator platform is effected by providing upon the shaft 82, a collar 101, which is fixed to said shaft and which has a nose-like projection 102 upon one side thereof, which when the shaft is rotated counter-clockwise, as viewed in Fig. 8, engages the lower end of the latch 95 and swings it clear of the yoke 78, releasing the latter and thereby enabling the elevator platform to descend to its lower level.

The general mode of operation of the apparatus will now be described.

The operator or clerk stationed, for example, at station 4, diagrammatically indicated in Fig. 9, desiring to send a tray to any given station, as for example that designated station 5, places the tray upon the elevator platform and raises the latter by means of the rope 80 to its uppermost position, preparatory to delivering the carrier from the elevator platform onto the upper run of belt by pulling down upon the cord 86. The elevator platform having been raised to its upper level is there held by the latch 95 until the tray has been nearly ejected from the platform, whereupon continued movement of the operating handle 83 by the cord 86, unloads the platform and also unlatches it, after which said platform descends to its lower position.

Had the operator at station 4 desired to send the tray in the opposite direction, as to station 3 (not shown); he would of course have loaded the elevator platform with a tray adapted to be selectively removed at station 3, which would have effected automatically an operative disposition of the latch 71, in the manner above described. The rope 80 would then have been pulled down only sufficiently to raise the tray to a position where the latch 71 could engage the bar 75, after which the rope 80 would have been released and the cord 86 would then have been pulled downwardly, as in the preceding case. This action would have displaced the tray from the elevator platform onto the lower run of the belt, and said tray would then have traveled to the left as viewed in Fig. 9, until its finger 14 engaged the guide 12 at station 3.

In any case, whether the tray be despatched to the right over the upper run of belt, or to the left over the lower run, from station 4, provided that the proper tray had been selected, said tray will be selectively removed from which ever run of belt it is upon and will be placed in the corresponding lowerator at the station for which it is destined, whereupon said lowerator will be unlatched by the engagement of its arm 36 with a side of the tray, and tray and lowerator will descend to the lower level where the lowerator cradle is automatically unloaded by the unlatching and cradle-tilting mechanism shown in Fig. 5. The cradle having thus been properly tilted, the tray rides out by gravity over the cradle rollers and subsequently over those designated 46, to the floor or platform 103, from which it may be removed by the operator stationed at this point.

In general therefore it will be observed that I have provided a way, which as a whole comprises upper and lower runs of belt and a structure for supporting the same and guiding the carriers, to the end that trays, or in certain cases other articles, may be transported from one station to another, whether said other station be upon one side of the despatching station or upon the opposite side of the same; as a result of which all stations may freely intercommunicate with each other and this without the necessity for sending the trays first to any central station. The elevation of the run-way clears the floor therebeneath in very large measure; since both the upper and lower runs of the belts may be disposed well up toward the ceiling. The elevating and lowerating appliances permit of the trays being despatched from and automatically delivered at a low level at each station.

The provision of means for preventing a succeeding tray, destined for the same station as one previously delivered to a given lowerator, from falling down upon the load already emplaced in said lowerator or from at least dropping through a considerable distance, is of importance; while the added feature of stopping any succeeding trays which might collide with the tray so stopped and thereby possibly jam the way, is a desirable feature; especially as, in the exemplified construction which is of course preferred, gravity alone is not depended upon to start a stopped tray preparatory to emplacing it upon the re-ascended lowerator platform or cradle; but rather is the continued frictional engagement between the partially removed tray and the run of the belt upon which it has been riding, relied upon to aid gravity and thus effect the prompt emplacement of the delayed tray upon its lowerator.

Having thus described my invention what I claim is:

1. A tray conveyer having therein a way and means adapted to convey trays along said way, and means at each of a plurality of stations along said way for selectively determining removal from said way of a tray intended for that station, devices at one or more of said stations for delivering a tray so removed from said way at said station to a level different from that of said way at said station, and means automatically operative during occupation of said devices by a previously removed tray for preventing removal from said way of a second and following tray traversing said way.

2. In a tray conveyer, the combination of a way having means adapted to carry trays therealong, a plurality of stations along said way, means to automatically remove trays from said way according to the stations for which said trays are destined, one at least of said stations having a lowerator adapted to receive and lower one tray at a time after said tray has been thus selectively removed from said way, and means for preventing the removal of a second and following tray from said way for delivery to said lowerator, while the latter is still occupied by the tray previously delivered thereto.

3. In a tray conveyer system the combination of a way having moving means adapted to carry trays therealong, a part of said means traveling in one direction and another part traveling in the opposite direction and each of said parts being adapted to carry trays, a plurality of stations along said way, two lowerators at each of said stations, one to co-act with the first mentioned part of said means and the other to co-act with the second mentioned part of said means, and means to selectively remove trays traveling along either of said parts in accordance with the stations for which they are destined and deliver the so selectively removed trays to the corresponding lowerators.

4. In a tray conveyer system the combination of a way having moving means adapted to carry trays therealong, a part of said means traveling in one direction and another part traveling in the opposite direction and each of said parts being adapted to carry trays, a plurality of stations along said way, two lowerators at each of said stations, one to co-act with the first mentioned part of said means and the other to co-act with the second mentioned part of said means, means to selectively remove trays traveling along either of said parts in accordance with the stations for which they are destined and deliver the so selectively removed trays to the corresponding lowerators, and means to despatch trays from each of said stations.

5. In a tray conveyer system the combination of a way having moving means adapted to carry trays therealong, a part of said means traveling in one direction and another part traveling in the opposite direction and each of said parts being adapted to carry trays, a plurality of stations along said way, two lowerators at each of said stations, one to co-act with the first mentioned part of said means and the other to co-act with the second mentioned part of said means, means to selectively remove trays traveling along either of said parts in accordance with the stations for which they are destined and deliver the so selectively removed trays to the corresponding lowerators, and means, common to both parts of said tray carrying means, for despatching trays along said way in either direction.

6. In a tray conveyer system the combination of a way having moving means adapted to carry trays therealong, a part of said means traveling in one direction and another part traveling in the opposite direction and each of said parts being adapted to carry trays, a plurality of stations along said way, two lowerators at each of said stations, one to co-act with the first mentioned part of said means and the other to co-act with the second mentioned part of said means, means to selectively remove trays traveling along either of said parts in accordance with the stations for which they are destined and deliver the so selectively removed trays to the corresponding lowerators, and tray elevating means, common to both parts of said tray carrying means, for despatching trays along said way in either direction.

7. In a tray conveyer system, the combination of an endless tray carrying means having two runs thereof at different levels, one of said runs traveling in one direction and the other in the opposite direction, with tray elevating means, common to both of said runs and adapted to lift a tray to substantially the level of either run, and co-acting means for unloading a tray from said mechanism onto either of said runs, whereby to despatch said tray in either of said directions.

8. In a tray conveyer system, the combination of an endless tray carrying means having two runs thereof at different levels, one of said runs traveling in one direction and the other in the opposite direction, with tray elevating means including a support for a tray, common to both of said runs and adapted to lift a tray to substantially the level of either run, means to hold said support against inadvertent downward movement when raised to position to deliver a tray to either of said runs, means to unload said tray onto the run corresponding to the position in which said support is held, and means to release said support after it has been unloaded.

9. In a tray conveyer system, the combination of continuously moving tray carrying means with means to deliver a tray from a lower level to and effect its emplacement upon said carrying means, and automatic means to thereafter selectively remove said tray from said carrying means and return it to a lower level, said tray delivering means including a support upon which said tray is loaded, means to elevate said support, and means to hold said support in its upper position from which the tray may be delivered to said carrying means, only so long as said support is loaded with a tray.

10. In a tray conveyer system, the combination of continuously moving tray carrying means with means to deliver a tray from a lower level to and effect its emplacement upon said carrying means, said tray delivering means including a support upon which said tray is loaded, means to elevate said support, and means to hold said support in its upper position from which the tray may be delivered to said carrying means, only so long as said support is loaded with a tray.

11. In a tray conveyer system, the combination of continuously moving tray carrying means with means to deliver a tray from a lower level to and effect its emplacement upon said carrying means, said tray delivering means including a support upon which said tray is loaded, means to elevate said support, means to hold said support in its upper position from which the tray may be delivered to said carrying means, only so long as said support is loaded with a tray, and means to eject said tray from said support.

12. In a tray conveyer system, the combination of an endless belt for carrying trays upon both of its runs, respectively in one direction or the other, with means common to both of said runs for despatching a tray upon either of them, and means for selectively removing trays from either of said runs.

13. In a tray conveyer system, the combination of an elevated endless belt for carrying trays upon both of its runs, respectively in one direction or the other, with means to elevate a tray to either of two positions for despatching said tray upon one or the other of said runs, means to automatically hold said elevating means in either of said two positions until the tray is delivered therefrom, means to effect the unloading of said elevating means, and means to automatically and selectively unload said tray from either run of said belt when the place for which said tray is destined is reached.

14. In a tray conveyer system, the combination of an elevated endless belt for carrying trays upon both of its runs, respectively in one direction or the other, with means to elevate a tray to either of two positions for despatching said tray upon one or the other of said runs, means to hold said elevating means in either of said two positions until the tray is delivered therefrom, means to effect the unloading of said elevating means, and means to automatically and selectively unload said tray from either run of said belt when the place for which said tray is destined is reached.

15. In a tray conveyer system, the combination of an elevated endless belt for carrying trays upon both of its runs, respectively in one direction or the other, with means to elevate a tray to either of two positions for despatching said tray upon one or the other of said runs, means to latch said elevating means in either of said two positions until the tray is delivered therefrom, means to effect the unloading of said elevating means, means to then unlatch said elevating means and means to thereafter automatically unload said tray from whichever run of said belt it has been emplaced upon.

16. In a conveyer system, the combination of a normally open way, means to carry articles along said way, means to selectively remove an article from said way, a device to receive the removed article, a stop in the path of articles traveling along said way and approaching said receiving device, means controlled by said receiving device for preventing the delivery of an article thereto when said device is unadapted to properly receive said article, and means controlled by said last mentioned article, for operatively positioning said stop in the path of a succeeding article.

17. The combination of a tray carrying belt conveyer having a pluraity of stations therealong, with elevating and lowering apparatus at said stations provided with means for emplacing trays upon the belt of said conveyer and for removing said trays therefrom, the means to remove said trays comprising selective deflecting guides each corresponding in its position with respect to the conveyer, to a determined station, and trays having parts to co-act with said guides to sweep said trays off of said belt, each at a predetermined station for which such tray is destined when being carried by said conveyer.

18. The combination of a belt conveyer having a plurality of stations therealong, with elevators and lowerators at said stations for respectively raising and lowering articles to and from a given run of the belt of said conveyer, means to displace articles from said elevators onto said belt, and means to selectively remove said articles from said belt and emplace them upon the lowerators of the stations for which said articles are destined.

19. The combination of a belt conveyer having a side or run thereof normally traveling in one direction and a run thereof normally traveling in an opposite direction, stations along said conveyer, means to move an article to be conveyed from a given station, from a despatching point at said station located at a level different from that of either one of said conveyer runs, substantially to the level of either of said runs, means for then laterally displacing said article to emplace it upon the corresponding run, and means for selectively sweeping said article from whichever of said runs it is traveling upon, when said article arrives at the one of said stations for which it is destined.

20. The combination of a belt conveyer having a side or run thereof normally traveling in one direction and a run thereof normally traveling in an opposite direction, a station along said conveyer located at a different level from either of said runs, means to move an article from said station toward and emplace it upon either one of said runs, and means to selectively sweep an article destined for said station, from either of said runs and convey it to the level of said station.

21. The combination of a conveyer having a side or run thereof normally traveling in one direction and a run thereof normally traveling in an opposite direction, a lowerator for each of said runs, each lowerator having a platform normally held at substantially the level of its corresponding run, means to move said platforms up to their proper levels, means to latch said platforms at said levels, means for selectively removing an article being carried by a run of said conveyer, from the latter to the corresponding lowerator, and means actuated by said article for freeing the platform of said corresponding lowerator, the weight of said article thereafter causing said platform to descend to a lower level.

22. The combination of a conveyer having a side or run thereof normally traveling in one direction and a run thereof normally traveling in an opposite direction, a lowerator for each of said runs, each lowerator having a platform normally held at substantially the level of its corresponding run, means to move said platforms up to their proper levels, means to latch said platforms at said levels, means for selectively removing an article being carried by a run of said conveyer from the latter to the corresponding lowerator, means actuated by said article for freeing the platform of said corresponding lowerator, the weight of said article thereafter causing said platform to descend to a lower level, and means to despatch articles from said lower level up to and emplace said articles upon at least one of said runs.

23. The combination of a conveyer having a side or run thereof normally traveling in one direction and a run thereof normally traveling in an opposite direction, a lowerator for each of said runs, each lowerator having a platform normally held at substantially the level of its corresponding run, means to move said platforms up to their proper levels, means to latch said platforms at said levels, means for selectively removing an article being carried by a run of said conveyer from the latter to the corresponding lowerator, means actuated by said article for freeing the platform of said corresponding lowerator, the weight of said article thereafter causing said platform to descend to a lower level, and means to despatch articles from said lower level up to and emplace said articles upon either one of said runs.

24. The combination of a conveyer having a side or run thereof normally traveling in one direction and a run thereof normally traveling in an opposite direction, a lowerator for each of said runs, each lowerator having a platform normally held at substantially the level of its corresponding run, means to move said platforms up to their proper levels, means to latch said platforms at said levels, means for selectively removing an article being carried by a run of said conveyer, from the latter to the corresponding lowerator, and means actuated by said article for freeing the platform of said corresponding lowerator.

25. In a conveyer system, the combination of a moving endless belt for carrying articles upon both of its runs, respectively in one direction or the other, with means common to both of said runs for despatching a tray upon either of them, and means for selectively removing the articles from either of said runs.

26. In a conveyer system, the combination of an endless belt for carrying articles upon both of its runs, respectively in one direction or the other, with means to move an article to either of two positions for despatching said article upon one or the other of said runs, means to hold said article moving means in either of said two positions until the load is delivered therefrom, means to effect the unloading of said article moving means, and means to automatically and selectively unload said article from either run of said belt when the place for which said article is destined is reached.

27. The combination of a belt conveyer having a plurality of stations therealong, with means for moving articles toward and also means for moving articles away from said belt conveyer at said station, to effect elevation or loweration of said articles with respect to a given run of the belt of said conveyer, apparatus to displace articles from one of said means at a given station onto said belt, and means to selectively remove said articles from said belt and emplace them upon an oppositely moving means at another of said stations for which said articles are destined.

28. The combination of a conveyer having a moving article conveying belt and a plurality of stations along the path of travel of said belt, with means for moving articles toward and also means for moving articles away from said belt conveyer at said stations, apparatus to displace articles from one of said means at a given station onto said belt and means to selectively remove said articles from said belt and emplace them upon another and oppositely acting one of said article moving means at another of said stations for which said articles are destined.

In testimony whereof I have affixed my signature, in the presence of two witnesses.

WILLARD ADNA MARCY.

Witnesses:
ALICE G. CONWAY,
DAISY L. BENNETT.

Copies of this patent may be obtained for five cents each, by addressing the "Commissioner of Patents, Washington, D. C."